Figure 1:
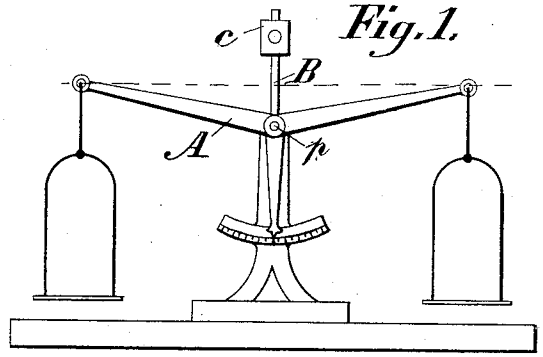

(No Model.)

F. A. ROEDER & A. SPRINGER.

TORSIONAL PIVOT BALANCE.

No. 310,542. Patented Jan. 6, 1885.

Attest:
C. Shappell
C. Diebold

Inventors:
Frederick A. Roeder,
Alfred Springer,
By Knight Hosea, Attorney.

N. PETERS, Photo-Lithographer, Washington, D. C.

UNITED STATES PATENT OFFICE.

FREDERICK A. ROEDER AND ALFRED SPRINGER, OF CINCINNATI, OHIO.

TORSIONAL-PIVOT BALANCE.

SPECIFICATION forming part of Letters Patent No. 310,542, dated January 6, 1885.

Application filed March 31, 1884. (No model.)

*To all whom it may concern:*

Be it known that we, FREDERICK A. ROEDER and ALFRED SPRINGER, citizens of the United States, residing at Cincinnati, Ohio, have invented new and useful Improvements in Torsional-Pivot Balances, of which the following is a specification.

Our invention relates to that class of balances in which, as a substitute for "knife-edges" or similar fixed fulcrum-supports, an elastic body is employed as a fulcrum acting upon the principle of molecular displacement—as, for example, a stretched metallic wire acting torsionally.

In ordinary fulcrum-balances it is essential that the center of gravity be below the center of oscillation of the beam, in order that the beam, when deflected from its normal position of rest, shall return thereto. It is also an obvious condition that increase of weight, as in loading the scale in use, increases the friction of the fulcrum-supports, and, further, that a like result attends the multiplication of levers, which renders such construction of ordinary fulcrum-balances impracticable for delicate uses. In the class of scales to which our invention is applied, however, the beam is returned to its normal position by the molecular elasticity of the fulcrum-support. Consequently the center of gravity may be above the center of oscillation, and the element of friction being eliminated, the only difficulty to be overcome in multiplying the leverage, while retaining sensitiveness, is the increased resistance to deflection of the beams from the position of rest; but this difficulty is within control, while friction is not, and it is the object of our invention to avail ourselves of these radical differences between the two classes of balances and produce balances of extraordinary sensitiveness and capacity. In such scales it has been found that a weight or poise arranged upon a vertical standard oscillating with the beam and opposing an increasing weight by leverage to the increasing resistance of the elastic fulcrum and terminal pivots counterbalances such resistance and adds essentially to the sensitiveness of the balance. This, however, we do not assert as our joint invention, the same being covered by the application of Dr. Roeder, now on file, filed July 10, 1884, Serial No. 137,293; but we find that where a connected series of levers is employed—as, for example, in platform-scales—the weight used as a poise to elevate the center of gravity may be applied to each of the levers separately, or to any one of the series, preferably to the last, and upon this principle a scale may be constructed having extreme delicacy combined with a magnified range of notation.

Our invention then consists in a balance embodying the above-stated principle.

Figures 3, 4, 6, 7, 8:
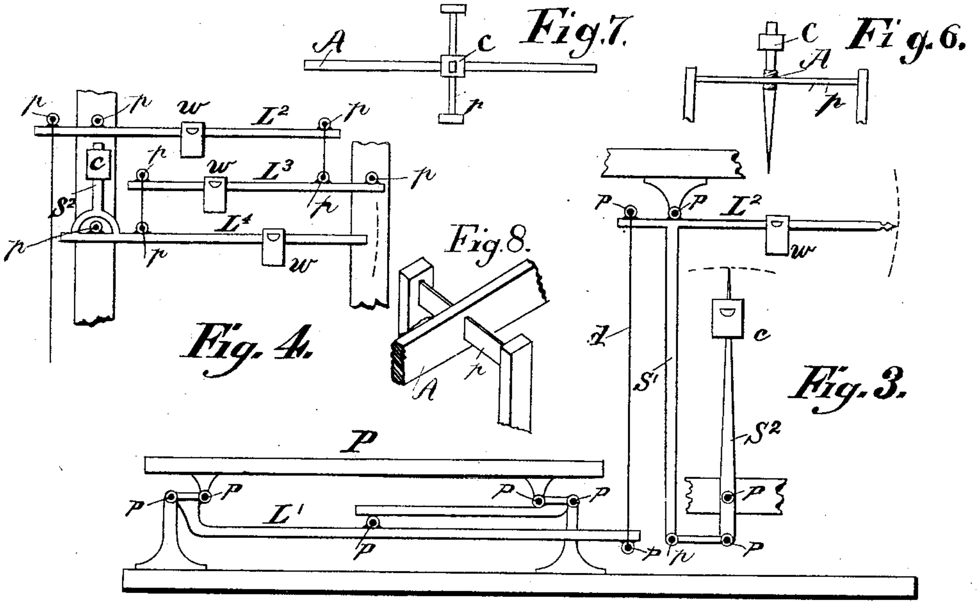

In the accompanying drawings, illustrating our invention, Figure 1 is an elevation of a simple torsional-pivot scale to which our invention is applied. Fig. 3 is an elevation of an ordinary torsional-pivot grocer's scale or platform-balance to which our invention is applied by mounting the poise upon a pivoted standard or pointer connected with the last lever of the series; Fig. 4, a modification of the foregoing, showing additional levers with the poise mounted directly upon the last of the series; and Fig. 5, an elevation of a multiplied lever-balance for delicate uses, showing the poises applied to each of the beams. Fig. 6 is an end view, and Fig. 7 a plan, of so much of a balance as is necessary to show a torsion-pivot. Fig. 8 is a perspective view of so much of the device as is necessary to illustrate the central portion of a scale-beam, a torsional pivot, and pivot-supports.

Referring now to the drawings, A designates an ordinary scale-beam mounted upon a central fulcrum consisting of an elastic body—such as a stretched metallic wire, *p*—which by its torsional resistance opposes the oscillation of the beam from its normal position of rest. Now, it is obvious that the resistance in such case increases uniformly in proportion to the amount of deflection of the beam from its point of rest, and that with the increased strength of metal required for pivots of scales for heavy weights the torsional resistance is also increased to a degree impairing the sensitiveness of the scale. To overcome this difficulty and render the resistance practically uniform at any deflected position of the scale-beam, we attach to the beam a central vertical standard, B, and provide the same with a weight, *c*, preferably adjustable; and in order that the center of gravity may not be lowered below the center of rotation and the counterbalancing effect lost by loading the scale-pans in the ordinary use of the scale, we elevate the points of load-suspension to the line of the center of gravity of the balance. Supposing the line of the center of gravity to be as represented by the dotted line, Fig. 1, the ends of the beam or the points of suspension of the scale-pans are arranged in that line. This may be done either by bending the beam upward, as shown in Fig. 1, or by turning up the ends merely.

Figure 5:
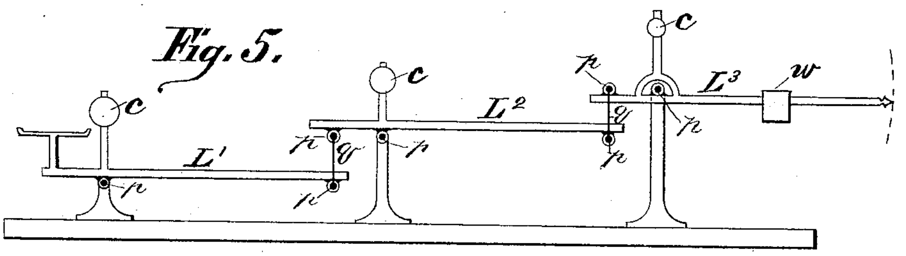

The same principles apply to multiplied beam-scales, with the important additional principle, already referred to, an embodiment of which is shown in Figs. 3, 4, and 5.

In the ordinary platform-scale (shown in Fig. 3) P designates the platform, and $L'$ $L^2$ primary and secondary supporting-levers, the connections being torsional pivots *p*, of stretched metallic wires, requiring no special description. In the case, shown as a matter of convenience of construction, the lever $L^2$ is a bell-crank, having a depending arm, $S'$, connected at its lower end by a link on torsional pivots, with a pivoted standard, $S^2$, serving the double purpose of a pointer and a standard for the support of the adjustable poise *c*.

It is obvious that the effect of the weight would be precisely the same were the standard carrying the weight arranged vertically above the center of rotation of and attached to the beam $L^2$. This construction is shown in Fig. 4, in which the standard $S^2$, carrying the poise *c*, is placed above the center of rotation of a lever $L^4$, connected with $L^2$ by an intermediate lever, $L^3$, these three being arranged parallel to each other, and provided with sliding weights *w*, and proportioned to indicate certain definite relations of weights upon the platform.

In Fig. 5 the levers $L'$ $L^2$ $L^3$ are arranged in simple consecutive order, connected by links *q* on torsional pivots *p*, and each lever provided with a poise, *c*; but any two may be dispensed with and only one, preferably the last, retained.

By the use of the counterbalancing-poises the scale shown in Fig. 5 possesses great delicacy and sensitiveness, yet gives a wide arc of notation at the lever $L^3$.

We claim as our invention and desire to secure by Letters Patent—

1. A beam-balance having its center of gravity above the center of rotation, and having its load-supports suspended from points in a line with the center of gravity of the balance, in combination with a supporting-pivot which acts torsionally by molecular displacement, substantially as described.

2. In a balance, a connected system of levers, each hung on an elastic torsional pivot, and a counterpoise connected to one only of the levers, vertically above its pivot, so as to control the movement of the series, substantially as described.

In testimony whereof we have hereunto set our hands in the presence of two subscribing witnesses.

FREDERICK A. ROEDER.
ALFRED SPRINGER.

Witnesses:
L. M. HOSEA,
C. SHAPPELL.